(12) United States Patent
Rutan (10) Patent No.: US 6,276,866 B1
(45) Date of Patent: Aug. 21, 2001

(54) TENSIONED STRUCTURAL COMPOSITE JOINT

(76) Inventor: Elbert Rutan, Scaled Composites, Inc., 1624 Flight Line, Mojave, CA (US) 93501

( * ) Notice: Subject to any disclaimer, the term of this patent is extended or adjusted under 35 U.S.C. 154(b) by 0 days.

(21) Appl. No.: 09/158,187

(22) Filed: Sep. 22, 1998

(51) Int. Cl.⁷ ........................................................ F16B 5/00
(52) U.S. Cl. .................. 403/375; 403/267; 244/119; 244/131
(58) Field of Search ...................... 244/119, 131, 244/132; 285/252, 253, 254; 403/24, 375, 267, 373, 404

(56) References Cited

U.S. PATENT DOCUMENTS

| | | | |
|---|---|---|---|
| 1,116,049 | * | 11/1914 | Feeny ................................. 285/253 |
| 2,167,686 | * | 8/1939 | Schmidt ............................... 244/131 |
| 2,198,996 | * | 4/1940 | Guarnaschelli ....................... 285/254 |
| 3,303,669 | * | 2/1967 | Oetiker ............................. 285/252 X |
| 4,486,035 | * | 12/1984 | Storke ................................. 285/253 |
| 4,593,870 | * | 6/1986 | Cronkhite et al. ............... 244/119 X |
| 4,611,832 | * | 9/1986 | Matsuoka et al. ............... 285/252 X |
| 4,674,712 | * | 6/1987 | Whitener et al. ..................... 244/119 |
| 5,496,002 | * | 3/1996 | Schutze ........................... 244/131 X |

\* cited by examiner

*Primary Examiner*—Harry C. Kim
(74) *Attorney, Agent, or Firm*—Gregory Garmong (57) ABSTRACT

A joint structure, such as a bulkhead joined to an annular shell, is formed by providing a conforming pattern of ridges and valleys on the facing portions of the elements to be joined. A tensioned band is applied to the external surface of the annular shell overlying one of the ridges in the annular shell. The tensioned band stresses the joint in compression, offsetting subsequently applied shear stresses so as to negate peeling failure forces. The joint loadings are sustained with a mechanical interlocking, making the use of an adhesive optional.

25 Claims, 5 Drawing Sheets

TENSIONED STRUCTURAL COMPOSITE JOINT

BACKGROUND OF THE INVENTION

This invention relates to joint structures for composite materials, and, more particularly, to a joint that is resistant to shear and peel failures and whose strength does not deteriorate over time.

In the manufacture of structures made of composite materials, large parts may often be fabricated as integral subassemblies, avoiding the need for as many mechanical joints as are usually found in metallic structures. However, it is still necessary to join the subassemblies to each other with mechanical joints. Experience has shown that adhesively bonded mechanical joints are usually preferred to joints using fasteners, because the adhesive spreads the structural loadings over a relatively large area to reduce stress concentrations in the joint. However, adhesives have the disadvantage that they may degrade by embrittlement or other mechanisms over a period of time, raising questions about the long-term integrity of the joint. Also, a bonded joint, if failed at the edge, will peel, which is a progressive failure across the joint, during subsequent repeated application of a load that is significantly lower than the normal failure load.

In one type of joint that may be discussed as exemplary, a base leg butts against and is joined to a cross piece, defining a T-shaped joint. This type of joint has many applications, such as, for example, the joining of a pressure bulkhead to an annular skin shell structure. In one application, an aircraft built of composite materials has a fuselage in the form of a thin annular shell or skin. Within the fuselage, an internal bulkhead, also made of composite materials, separates the pressurized passenger compartment from the unpressurized environment, from a fuel tank, or from some other compartment. The pressure bulkhead must be able to sustain, with a safety factor, a pressure differential of as much as about 10 pounds per square inch.

The bulkhead is joined to the annular shell structure around the periphery of the bulkhead, so as to provide both structural support and a pressure seal. This joint is in the form of a T-joint, when viewed in circumferential section.

Because the pressurization load is critical to safely (joint failure is catastrophic) and because this load is continuous for most of the duration of any flight, this joint is extremely important. It is not generally acceptable to use a bonded-only thin joint for the bulkhead/fuselage joint. Instead, the bonded joint is typically made oversize or backed up with additional structure. In one approach, for example, a backup using a large number of fasteners is employed, adding substantial weight to the aircraft.

In another approach, the bulkhead is joined to the inside wall of the annular shell using a flange on the circumference of the bulkhead or a series of tapes. In the flange technique, the outer circumference of the bulkhead is terminated in a flange whose outer surface is adhesively joined to the inner surface of the annular shell. The flange is made sufficiently wide so that the available adhesive bonding area will carry the loads of the bulkhead. The flange approach is operable, but it adds excessive weight to the structure and also is subject to deterioration if the strength of the adhesive degrades over time.

In the tape approach, tapes are formed of a number of lapped plies of composite material. The tapes are corner structural elements at the interface of the bulkhead and the skin, either bonded or laid up in place. Each tape is attached on one side to one face of the bulkhead, bent in the middle section of the tape, and attached on the other side to the inside of the annular shell. The attachment of the tape to the bulkhead and the tape to the inside of the annular shell is performed with adhesives. Tapes are placed on each side of the bulkhead. The joint is sealed with extra adhesive material, if necessary. When the bulkhead is loaded in service, it deforms in bending responsive to the pressure differential. The bending tends to elongate the tapes on the higher-pressure side of the bulkhead, and places the adhesive attachments of the tapes into shear loading. The predominant failure mode is an adhesive peel failure at the tape attachments. Because the aircraft must be built for extended-term service and because the shear properties of the adhesive material may deteriorate over time, the conventional practice is to overbuild the joint with extra tapes and extra adhesive attachment area.

While these approaches to the joint structure are operable, they cannot be certified for manned pressurized aircraft, because there remains the concern that some combination of circumstances may lead to unexpectedly accelerated deterioration of the adhesive and failure of the joint between the bulkhead and the annular skin shell. There is therefore a need for an improved joint design for composite materials to join a bulkhead to an annular shell. The present invention fulfills this need, and further provides related advantages.

SUMMARY OF THE INVENTION

The present invention provides a joint structure useful in joining two pieces of composite material together. Very little weight is added to the structure by the presence of the joint. An adhesive may be, and preferably is, used at the interface, but the adhesive is present primarily as a sealant. The loads at the joint are carried largely by mechanical interlocking, so that little if any load is borne by the adhesive. Consequently, deterioration of the strength of the adhesive over time is of much less concern than in conventional joints. The joint structure is useful in joining bulkheads to annular shells, as in aircraft and in tankage, as well as other applications.

In accordance with the invention, a structure comprises an exterior piece having an exterior piece inner surface comprising an exterior piece inner surface first ridge, an exterior piece inner surface second ridge, and an exterior piece inner surface valley between the exterior piece inner surface first ridge and the exterior piece inner surface second ridge. The exterior piece further includes an exterior piece outer surface oppositely disposed from the exterior piece inner surface. The structure also comprises an interior piece having an interior piece outer surface in facing contact to the exterior piece inner surface. The interior piece outer surface comprises an interior piece outer surface first valley, an interior piece outer surface second valley, and an interior piece outer surface ridge between the interior piece outer surface first valley and the interior piece outer surface second valley. The interior piece outer surface first valley is in engaging contact with the exterior piece inner surface first ridge, the interior piece outer surface second valley is in engaging contact with the exterior piece inner surface second ridge, and the interior piece outer surface ridge is in engaging contact with the exterior piece inner surface valley. A first tensioned element contacts the exterior piece outer surface at a location oppositely disposed from the exterior piece inner surface first ridge.

This approach may be applied in joining a bulkhead to an annular shell structure. Such a structure comprises a bulkhead having an outwardly facing outer periphery and an outwardly facing bulkhead ridge on the outer periphery of the bulkhead. There is an annular shell having a shell inwardly facing surface and a shell outwardly facing surface, a first inwardly facing shell ridge formed into the annular shell and extending circumferentially around the annular shell, and a second inwardly facing shell ridge formed into the annular shell and extending circumferentially around the annular shell. The second inwardly facing shell ridge is spaced apart from the first inwardly facing shell ridge to define a shell valley therebetween. The shell valley receives the bulkhead ridge therein. A first tensioned band contacts the shell outwardly facing surface and extends circumferentially around the shell outwardly facing surface at a location overlying the first inwardly facing shell ridge.

The ridge-and-valley texture serves to mechanically interlock the two elements being joined. The tensioning during manufacture initially loads the side of the joint that is to be subsequently stressed in shear into compression, so that the subsequent application of shear loadings relieves the compression. The interface is therefore not subjected to large tension loadings in service. Where it is possible that the joint will be loaded in the opposite direction in service, a second tensioned band may be provided so that the other side of the joint may also be prestressed in compression.

An adhesive is preferably, but not necessarily, placed into the interface between the two articles being joined. The adhesive carries little load, and its main mechanical requirement is that it not fail in moderate compression loadings, a requirement which in most cases is met relatively easily. The adhesive seals the joint against leakage, but is not a primary load-bearing element. This design is therefore a radical departure from conventional practice, where the adhesive bears the entire structural load and degradation of the adhesive may result in premature failure of the bonded structure.

The present approach is economical to practice and produces a structure which has very little added weight beyond that of the components being joined. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 3A–3B are sectional views of the aircraft structure taken along lines 2—2 of FIG. 1, illustrating the approach of the invention, wherein FIG. 3A is an exploded view and FIG. 3B is an assembled view;

DETAILED DESCRIPTION OF THE INVENTION

The present approach of preparing a structural joint may be used in a wide variety of applications. In a preferred application which will be discussed as exemplary, it is used to make a T-joint of a pressure bulkhead to the skin of an aircraft. That preferred embodiment will be used to illustrate the approach of the invention, but the invention is not so limited.

Figure 1:
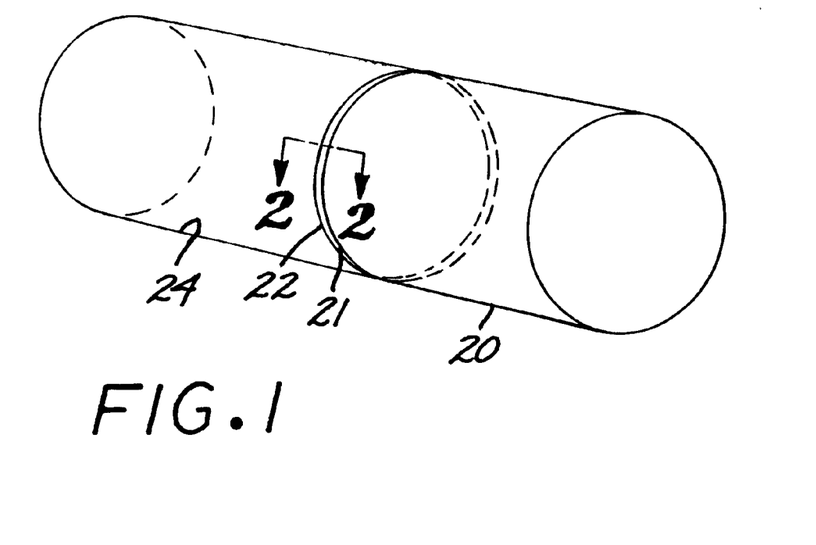
FIG. 1 is a perspective cutaway view of a portion of an aircraft structure wherein a bulkhead is joined to an annular fuselage shell.

FIG. 1 depicts an annular shell structure 20 that forms the skin of the fuselage of an aircraft, and which serves as the exterior piece for a joint. At an intermediate location along the length of the fuselage, an outwardly facing surface 21 of an internal bulkhead 22 is joined to an inwardly facing surface 24 of the shell structure 20. The bulkhead 22 serves as the interior piece for the joint. Both the shell structure 20 and the bulkhead 22 are each preferably made of a composite material such as carbon (including graphite), aramid, glass, or other fibers embedded in a thermoplastic or thermosetting organic resin matrix.

Figure 2:
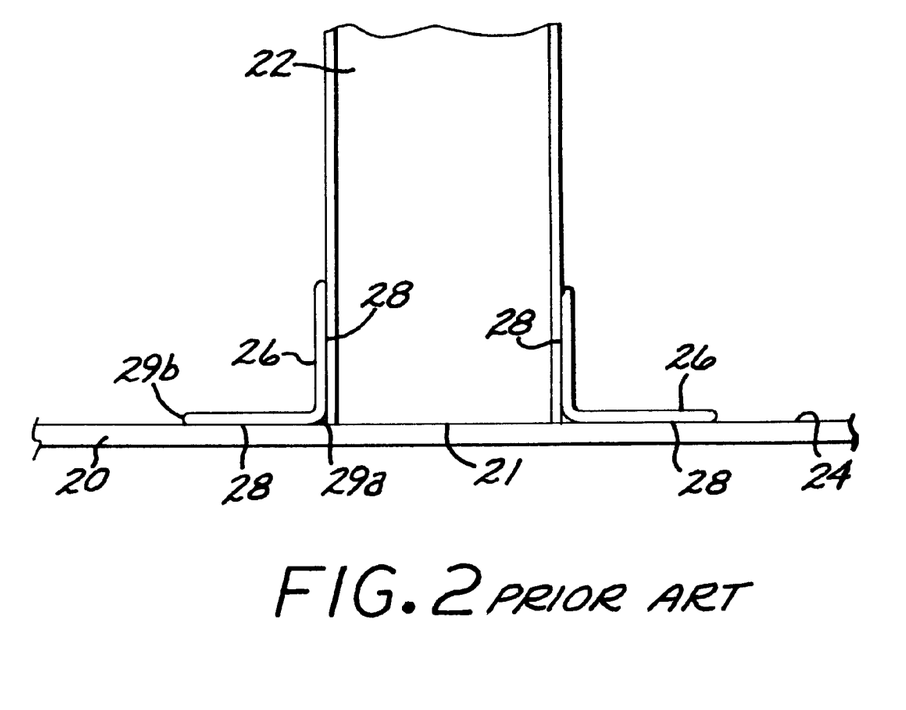
FIG. 2 is a sectional view of the aircraft structure of FIG. 1, illustrating a conventional approach for joining the bulkhead to the annular shell, taken along lines 2—2 of FIG. 1.

FIG. 2 illustrates one conventional joining approach for joining the bulkhead 22 to the shell structure 20. As seen in FIG. 2, this joint is a T-joint when viewed in cross section. In this conventional approach, tapes 26 having a 90 degree bend therein are adhesively bonded along bond lines 28 to the faces of the bulkhead 22 and to the inwardly facing surface 24 of the shell structure 20. When the bulkhead 22 is loaded from one side, as in the case where it separates a pressurized space from an unpressurized space, the adhesive bond lines 28 bear the joint loading, primarily in shear. The predominant failure mode is an adhesive bondline peel failure starting at a location 29a and/or 29b, for the case where the bulkhead 22 is pressurized from the left in FIG. 2. Great care must therefore be taken to ensure that the adhesive properties are stable for the expected life of the aircraft, which may be 20 years or more. Because of the possibility of adhesive deterioration over that period of time, the joint is typically overbuilt and requires backup fasteners, and is consequently much heavier than would otherwise be necessary.

Figure 3A:
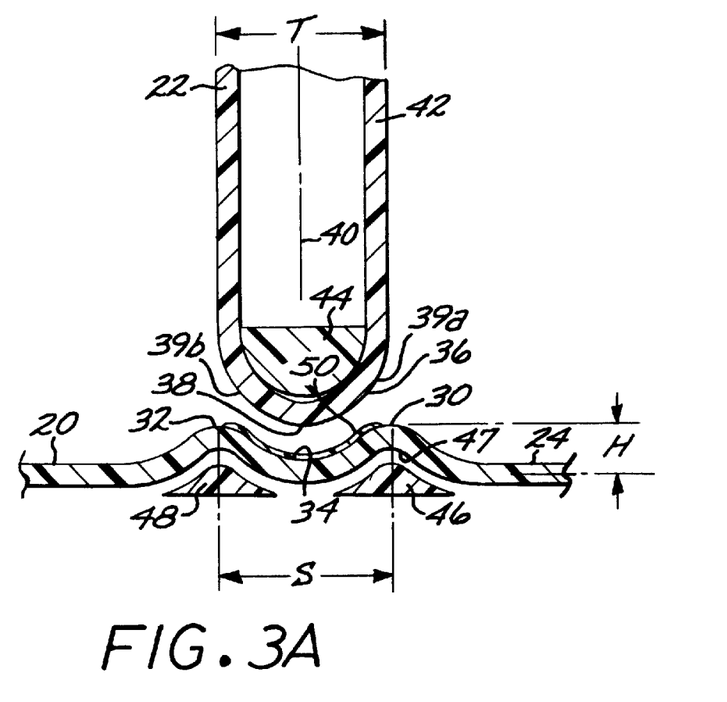
Figure 3B:
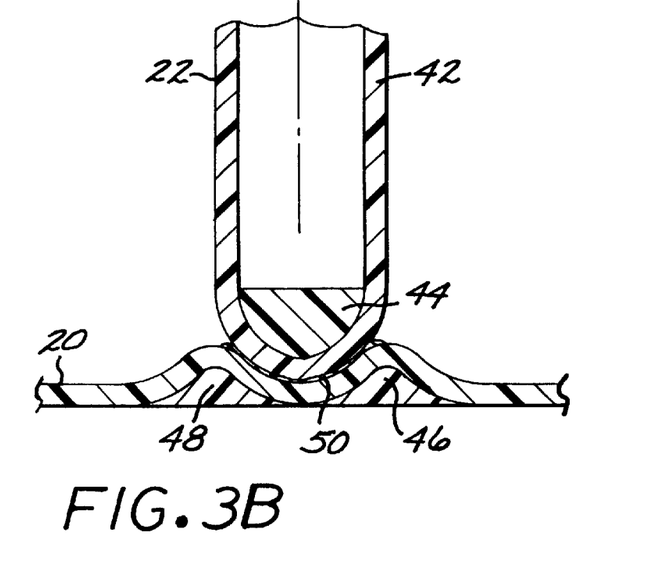

FIGS. 3A–3B depict the present approach for joining the bulkhead 22 to the shell structure 20 in a T-joint. The shell structure 20, which serves as the exterior piece and the crosspiece of the T-joint, is fabricated with at least a circumferentially extending inwardly extending first ridge 30 and a circumferentially extending second inwardly extending second ridge 32, on its inwardly facing surface 24. A circumferentially extending valley 34, also on the inwardly facing surface 24, lies between the ridges 30 and 32. The peak-to-peak spacing S of the ridges 30 and 32 is preferably about the same as the thickness T of the bulkhead 22. The height difference H between the top of the ridges 30 and 32, and the bottom of the valley 34, is greater than about 0.050 inches, and is preferably from about 0.050 inches to about 0.250 inches. The specific "waveform" shape of the ridges and valleys is not critical, and irregular forms may be used as will be discussed subsequently.

The bulkhead 22 has an outwardly facing outer surface or periphery 36 with a circumferentially extending bulkhead ridge 38 on the periphery 36 and facing outwardly. The bulkhead ridge 38 is illustrated as being coincident with a longitudinal centerline 40 of the bulkhead 22, but need not be so. The bulkhead ridge 38 is shaped and dimensioned so that it is conformably received within and engaged to the ridge-and-valley shape of the shell structure 20. Thus, there are effectively a first valley 39a and a second valley 39b in the outer surface of the bulkhead 20, on either side of the bulkhead ridge 38, facing the first ridge 30 and the second ridge 32, respectively.

The bulkhead 22 may be made of a single material, preferably a composite material such as carbon (including graphite), aramid, glass, or other fibers in a thermoplastic or thermosetting organic resin matrix. The bulkhead 22 may also be made of two or more different materials. For example, the bulkhead 22 may have a body 42 made of a first composite material, and a stiffener in the form of a stiffening layer 44 adjacent to but inside of the outer periphery 36 of the bulkhead 22. The stiffening layer 44 is made of a higher modulus, higher stiffness composite material than that used in the body 42, in order to resist elastic deformation resulting from the mechanical interlocking forces to be described subsequently.

The ridge-and-valley shape of the shell structure 20 and the ridge of the bulkhead may be equivalently described as a shell texture and as a bulkhead texture, respectively. The texture has a texture relief, which is the height difference between the high point and the low point of the texture. In the case described above, the texture relief of the shell texture and of the bulkhead texture are both about the same, and are equal to the height difference H. However, the texture reliefs of the two textures need not be exactly the same, inasmuch as differences are permitted.

A first tensioned band 46 contacts an outwardly facing surface 47 of the shell structure 20 and extends circumferentially around the shell outwardly facing surface 47, at a location overlying the first inwardly facing shell ridge 30. The first tensioned band 46 is preferably made of circumferentially extending carbon (including graphite), aramid, glass, or other fibers embedded in a thermosetting or thermoplastic resin matrix.

Optionally, a second tensioned band 48 contacts an outwardly facing surface 47 of the shell structure 20 and extends circumferentially around the shell outwardly facing surface 47, at a location overlying the second inwardly facing shell ridge 32. The second tensioned band 48 may be made of the same material as the first tensioned band 46, or a different material such as a different composite material.

The two bands 46 and 48 are preferably applied at locations which do not coincide with the longitudinal centerline 40 of the bulkhead 22, but instead are longitudinally displaced therefrom and thence from the neutral axis of deformation of the bulkhead. Preferably, one of the two bands 46 and 48 is displaced on each side of the centerline 40.

The effect of the tensioned bands 46 and 48 is to preload the contacted portion of the annular shell structure 20 into compression, and to preload the adjacent portion of the bulkhead 22, specifically the stiffening layer 44, into compression. The stiffening layer 44 of the bulkhead 22 is preferably present to minimize the extent of the preload deformation.

A layer 50 of an adhesive or a sealant may optionally be placed between the outer periphery 36 of the bulkhead 22 and the facing portion of the inwardly facing surface 24 of the annular shell structure 20. The adhesive layer 50 does not serve as the primary joining agent, and it therefore need not be selected to achieve particular adhesive properties. A preferred adhesive, where one is used, is a thermosetting resin such as an epoxy with an optional light-weight filler.

When the bulkhead 22 is in service and a pressure differential is applied between the two sides of the bulkhead, it is supported in place by its mechanical interlock with the ridge-and-valley features of the shell structure 20. The bulkhead 22 tends to deform, which deformation tends to unload the preloaded region on the higher-pressure side of the neutral axis of deformation of the bulkhead (which is usually approximately coincident with the longitudinal centerline 40 in the illustrated symmetrical case of FIGS. 3A–B). Stated alternatively, the preloading introduced by the tensioned band on the higher-pressure side of the neutral axis places the adjacent material into compression, which compression is relaxed by the applied deformation of the bulkhead in service. The result is that the maximum loading reached on the higher-pressure side of the neutral axis is near zero, so that there is little or no loading which leads to a peeling failure in that location. On the lower-pressure side of the neutral axis, the material is loaded further into compression, but compression loads in the practical magnitudes of interest are readily sustained without failure. If it is known that the service pressure differential is always on the same side of the bulkhead 22, then the preloading on the lower-pressure side may be made lower than that on the higher-pressure side so that the compressive forces reached on the lower-pressure side are not excessive. The preloading on the lower-pressure side may be as low as zero.

Most significantly, since the loads are neutral or compressive during service deformation of the bulkhead, no bond-line adhesive is required to carry loadings. For this reason, the layer 50 is optional from the standpoint of the joining and transmission of mechanical forces. The layer 50 is desirably present to provide the pressure seal between the higher-pressure side and the lower-pressure side of the bulkhead 22. The layer 50 may also serve to accommodate small differences and irregularities in the conforming profiles of the outer periphery 36 of the bulkhead 22 and the facing portion of the inwardly facing surface 24, and misalignment of the parts during assembly and joining. The accommodation of small irregularities in the facing surfaces allows interfacial loads to be transformed uniformly and without buildup of excessively large stress concentrations. The layer 50, where present, should be capable of sustaining the compressive loads experienced in service, but, as a general rule, adhesives and sealants are able to sustain much higher loads in compression than in tension.

Figure 4:
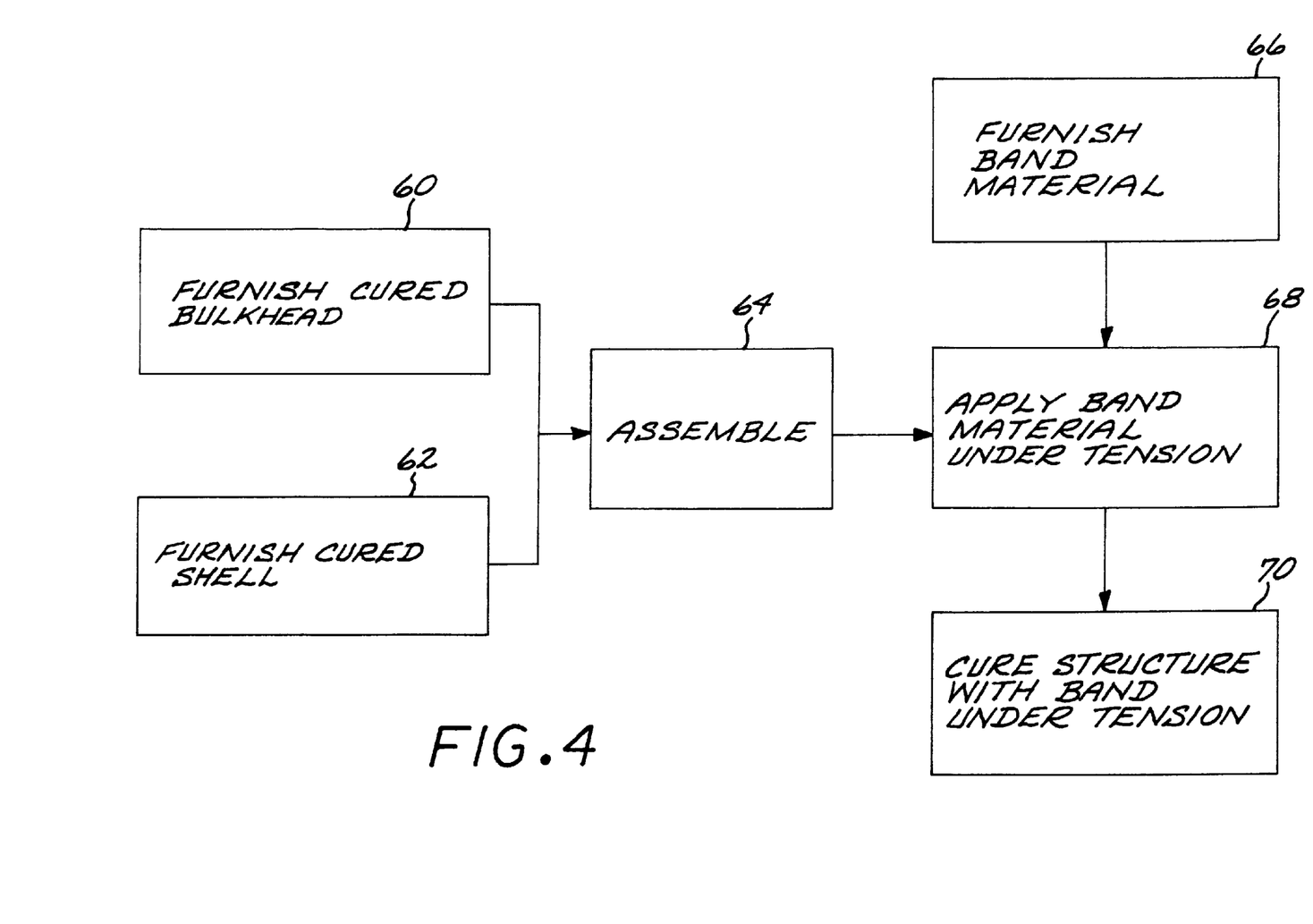
FIG. 4 is a block flow diagram illustrating a preferred approach for practicing the invention.

FIG. 4 illustrates a preferred approach for constructing the joint structure shown in FIG. 3. The bulkhead 22 is furnished, numeral 60, and the shell structure 20 is furnished, numeral 62. The bulkhead 22 and shell structure are pre-cured so that they are strong and do not excessively deform in the subsequent operations. The bulkhead and the shell structure are made by any operable technique. The bulkhead preferably includes the stiffening layer 44, and the shell structure includes the ridges 30 and 32, and the valley 34 formed in place. The band material used in the tensioned bands is furnished, numeral 66. The band material is applied overlying the back sides of the ridges 30 and 32 in tension, numeral 68, as shown in FIG. 3. Lastly, the assembly is cured as necessary, numeral 70, using the standard recommended procedure for the materials used. The band material is maintained under tension as it is cured. The bulkhead and the shell are processed through the curing step 70, although, being pre-cured, they cure little if at all in the further curing step 70.

Figure 5:
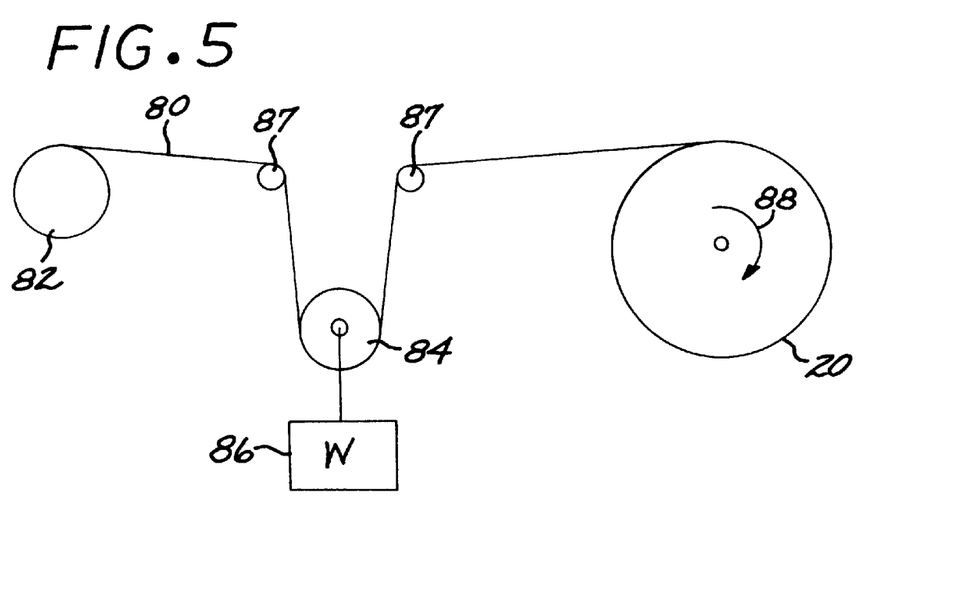
FIG. 5 is a schematic diagram of a device for applying tensioned bands.

FIG. 5 is a schematic depiction of an apparatus used to apply the band material with an applied tension in the steps 68 and 70. The band material 80 is furnished on a reel 82. The band material 80 is threaded from the reel 82 and under an idler pulley 84 having a suspended weight (W) 86. Support pulleys 87 support the loading imposed on the band material 80 by the weight 86. The band material 80 is thereafter wrapped onto the surface of the shell structure 20. The shell structure 20 is rotated about a center, as indicated by arrow 88, to wind the band material 80 onto the shell structure 20 under tension in step 68. The applied tension is maintained during the curing 70. The two bands 46 and 48 may be wound with the same or different tensions.

Figure 6:
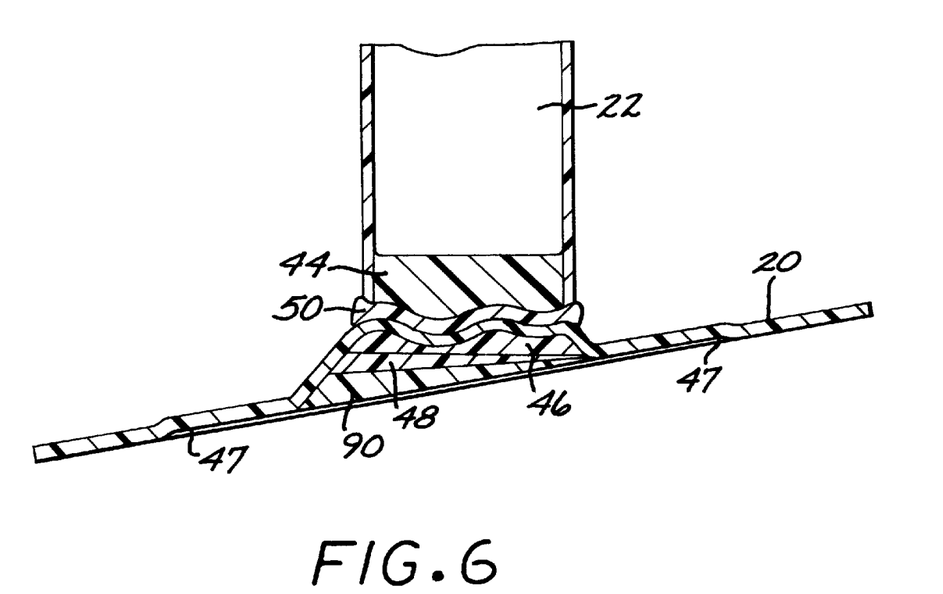
FIG. 6 is a sectional view of a second embodiment of the T-joint.
Figure 7:
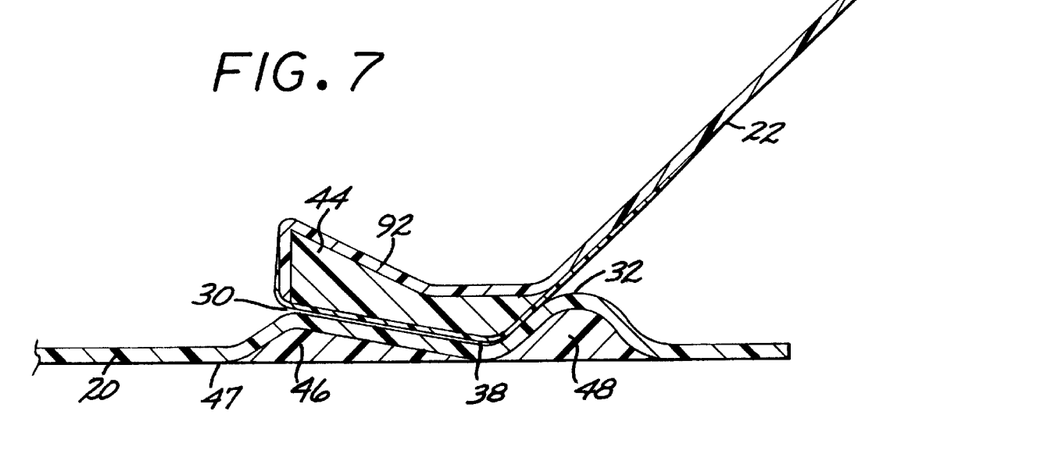
FIG. 7 is a sectional view of a third embodiment of the T-joint.

FIGS. 3 depict a symmetrical shell and bulkhead structure with a thick bulkhead, but the application of the invention is not so limited. FIGS. 6 and 7 illustrate two other examples of structures which are made with the present approach. The same numerals are used to identify equivalent elements in these figures, and the prior description is incorporated to the extent that it is applicable.

In the embodiment of FIG. 6, the bulkhead 22 is asymmetrically oriented at an angle to the shell structure 20. The ridge-and-valley configuration of the shell structure 20 is not symmetric as in FIG. 3, and there are more ridges and valleys in both the bulkhead and the shell structure than in the embodiment of FIG. 3. The bands 46 and 48 do not lie flush with the outwardly facing surface 47, and therefore a filler 90 such as a mass of organic resin is provided to smooth the surface 47.

In the embodiment of FIG. 7, the bulkhead 22 is very thin, as might be the case where the bulkhead is the generally hemispherical end of a pressure tank and the shell structure 20 is the interstage structure between tanks which are arranged in an end-to-end fashion. To provide an attachment, an enlargement 92 is formed at the periphery of the bulkhead 22, with the bulkhead ridge 38 formed on the enlargement 92. FIG. 7 also shows that the ridge 38 may be asymmetrically placed, and the ridges 30 and 32 may be asymmetrically placed and may be of different heights. Even with these modifications, the principles of operation of the joint are the same as discussed previously.

Figure 8:
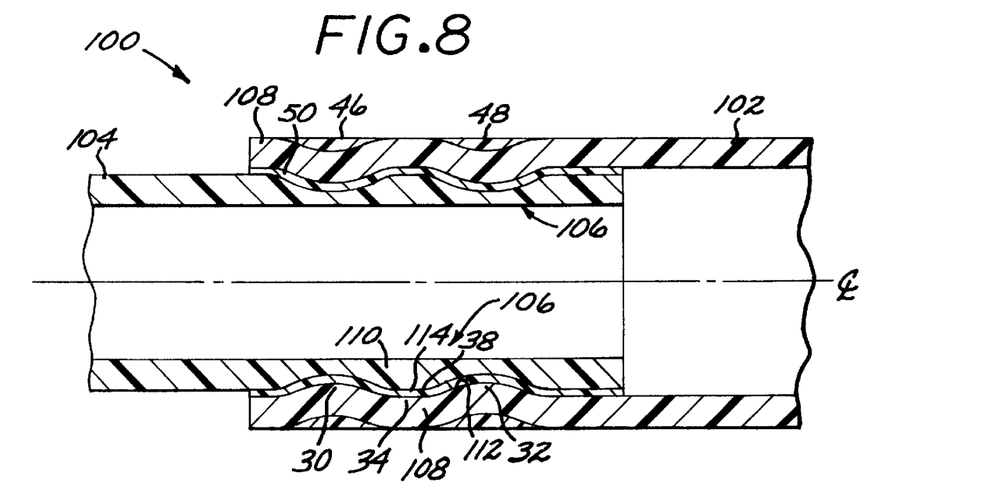
FIG. 8 is a sectional view of a tubular spar structure joined using the approach of the invention.

The discussion of the preferred embodiment has focused on a bulkhead/skin structure, by way of example. The invention is also applied to other structures which are loaded in service, and an example is shown in FIG. 8. Where appropriate, the same numerical identifiers as used previously are utilized here and the prior discussion is incorporated here, to emphasize the similarities in the structural joining technique. A joined composite spar structure 100 includes a first hollow tubular spar 102, a second hollow tubular spar 104, and a joint 106 therebetween. The first spar 102 comprises an exterior piece 108 at the joint 106, and the second spar 104 comprises an interior piece 110 that fits within the exterior piece 108 at the joint 106. The exterior piece 108 has ridges 30 and 32, and a valley 34, in its inner surface 112. The interior piece 110 has a ridge 38 in its outer surface 114. Tensioned bands 46 and 48 overlie the outer surface 116 of the exterior piece 108 opposite the ridges 30 and 32, respectively. An optional layer of adhesive 50 lies between the outer surface 114 and the inner surface 112. This joint structure is fabricated by substantially the same approach as described previously. A joint according to this approach was fabricated in a windmill blade support and was tested over a period of time to ensure its operability and stability.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A structure, comprising:
    an exterior piece having
        an exterior piece inner surface comprising
            an exterior piece inner surface first ridge,
            an exterior piece inner surface second ridge, and
            an exterior piece inner surface valley between the exterior piece inner surface first ridge and the exterior piece inner surface second ridge, and
        an exterior piece outer surface oppositely disposed from the exterior piece inner surface;
    an interior piece having an interior piece outer surface in facing contact to the exterior piece inner surface, the interior piece outer surface comprising
        an interior piece outer surface first valley,
        an interior piece outer surface second valley, and
        an interior piece outer surface ridge between the interior piece outer surface first valley and the interior piece outer surface second valley,
    wherein
    the interior piece outer surface first valley is in engaging contact with the exterior piece inner surface first ridge, the interior piece outer surface second valley is in engaging contact with the exterior piece inner surface second ridge, and the interior piece outer surface ridge is in engaging contact with the exterior piece inner surface valley; and
        a first tensioned element contacting the exterior piece outer surface at a location oppositely disposed from the exterior piece inner surface first ridge, wherein the first tensioned element is made of a composite material comprising fibers embedded in an organic matrix.
2. The structure of claim 1, further including
    a layer of adhesive disposed between the interior piece outer surface and the exterior piece inner surface.
3. The structure of claim 1, further including
    a second tensioned element contacting the exterior piece outer surface at a location oppositely disposed from the exterior piece inner surface second ridge.
4. The structure of claim 3, wherein the first tensioned element and the second tensioned element are made of different materials.
5. The structure of claim 1, wherein the fibers of the first tensioned element are made of a material selected from the group consisting of carbon, aramid, and glass and are oriented circumferentially.
6. The structure of claim 1, wherein the interior piece comprises
    an interior piece body made of a interior piece body material, and
    a stiffener at the interior piece outer surface, the stiffener having a modulus of elasticity greater than that of the interior piece body material.
7. The structure of claim 1, wherein the exterior piece comprises an annulus, and wherein the first tensioned element is wrapped circumferentially around the annulus.
8. The structure of claim 1, wherein the exterior piece inner surface first ridge and the exterior piece inner surface valley have a height difference of at least about 0.050 inches.
9. The structure of claim 1, wherein the interior piece is a bulkhead and the exterior piece is a shell.
10. The structure of claim 1, wherein the interior piece is a base leg and the exterior piece is a cross piece.
11. A structure, comprising:
    a bulkhead having an outwardly facing outer periphery;
    an outwardly facing bulkhead ridge on the outer periphery of the bulkhead;

an annular shell having a shell inwardly facing surface and a shell outwardly facing surface;

a first inwardly facing shell ridge formed into the annular shell and extending circumferentially around the annular shell;

a second inwardly facing shell ridge formed into the annular shell and extending circumferentially around the annular shell, the second inwardly facing shell ridge being spaced apart from the first inwardly facing shell ridge to define a shell valley therebetween, the shell valley receiving the bulkhead ridge therein; and a first tensioned band contacting the shell outwardly facing surface and extending circumferentially around the shell outwardly facing surface at a location overlying the first inwardly facing shell ridge.

12. The structure of claim 11, further including a layer of adhesive disposed between the outwardly facing outer periphery of the bulkhead and the shell inwardly facing surface.

13. The structure of claim 11, further including a second tensioned band contacting the shell outwardly facing surface and extending circumferentially around the shell outwardly facing surface at a location overlying the second inwardly facing shell ridge.

14. The structure of claim 11, wherein the bulkhead comprises a bulkhead body made of a bulkhead body material, and a stiffener at the bulkhead body outer surface, the stiffener having a modulus of elasticity greater than that of the bulkhead body material.

15. The structure of claim 11, wherein the first tensioned band is made of a composite material comprising fibers embedded in an organic matrix.

16. The structure of claim 15, wherein the fibers of the first tensioned band are made of a material selected from the group consisting of carbon, aramid, and glass and are oriented circumferentially.

17. A structure, comprising:

an interior piece having an outwardly facing outer periphery and a longitudinal centerline;

an outwardly facing interior piece texture on the outer periphery of the interior piece;

an annular shell having a shell inwardly facing surface and a shell outwardly facing surface;

an inwardly facing shell texture formed into the annular shell and extending circumferentially around the annular shell, the shell texture having a texture relief of at least about 0.050 inches, the interior piece texture being engaged to the relief texture; and a first tensioned band contacting the shell outwardly facing surface and extending circumferentially around the shell outwardly facing surface at a location overlying the interior piece but longitudinally offset from the longitudinal centerline, wherein the first tensioned element is made of a composite material comprising fibers embedded in an organic matrix.

18. The structure of claim 17, further including a layer of adhesive disposed between the interior piece outer periphery and the shell inwardly facing surface.

19. The structure of claim 17, further including a second tensioned band contacting the shell outwardly facing surface and extending circumferentially around the shell outwardly facing surface at a location overlying the interior piece but oppositely longitudinally offset from the longitudinal centerline relative to the first tensioned band.

20. The structure of claim 19, wherein the first tensioned band and the second tensioned band are made of different materials.

21. The structure of claim 17, wherein the fibers of the first tensioned band are made of a material selected from the group consisting of carbon, aramid, and glass and are oriented circumferentially.

22. The structure of claim 17, wherein the interior piece comprises an interior piece body made of an interior piece body material, and a stiffening layer at the periphery of the interior piece, the stiffening layer having a modulus of elasticity greater than that of the interior piece body material.

23. A method of preparing a structure, comprising the steps of furnishing an exterior piece having an exterior piece inner surface comprising
an exterior piece inner surface first ridge,
an exterior piece inner surface second ridge, and
an exterior piece inner surface valley between the exterior piece inner surface first ridge and the exterior piece inner surface second ridge, and an exterior piece outer surface oppositely disposed from the exterior piece inner surface;

furnishing an interior piece having an interior piece outer surface in facing contact to the exterior piece inner surface, the interior piece outer surface comprising
an interior piece outer surface first valley,
an interior piece outer surface second valley, and
an interior piece outer surface ridge between the interior piece outer surface first valley and the interior piece outer surface second valley;

assembling the interior piece outer surface first valley in engaging contact with the exterior piece inner surface first ridge, the interior piece outer surface second valley in engaging contact with the exterior piece inner surface second ridge, and the interior piece outer surface ridge in engaging contact with the exterior piece inner surface valley; and thereafter applying a first tensioned element contacting the exterior piece outer surface at a location oppositely disposed from the exterior piece inner surface first ridge, wherein the first tensioned element is made of a composite material comprising fibers embedded in an organic matrix.

24. The method of claim 23, including an additional step of curing the structure simultaneously with the step of applying.

25. The method of claim 23, wherein the fibers of the first tensioned element are made of a material selected from the group consisting of carbon, aramid, and glass and are oriented circumferentially.

* * * * *